3,317,631
THERMOSETTING RESINS OF ALIPHATIC OLEFIN, UNSATURATED ACID COPOLYMERS AND MELAMINE-FORMALDEHYDE RESINS
Richard Watkin Rees, Wilmington, Del., assignor to E. I. du Pont de Nemours and Company, Wilmington, Del., a corporation of Delaware
No Drawing. Filed Sept. 9, 1963, Ser. No. 307,313
1 Claim. (Cl. 260—854)

This invention relates to novel plastic compositions resulting from the reaction of copolymers of olefins and unsaturated carboxylic acids with melamine-formaldehyde polymers.

Polyethylene is a well-known thermoplastic material which is relatively inexpensive and has found an enormous market for the production of household utensils and the like. The principal drawback of polyethylene is its relatively low softening temperature which, in the case of the flexible, low density varieties, renders it unsuitable for use in automatic dishwashers, for sterilization for "Heat and Serve" food containers, and the like.

Thermosetting resins, on the other hand, such as melamine-formaldehyde polymers, are generally inflexible and lacking in desirable toughness.

It has now been discovered that when copolymers of lower aliphatic olefins with small amounts of unsaturated acids are intimately blended with melamine formaldehyde resins a chemical crosslinking occurs, which is evidenced by the substantial decrease in intensity of infrared absorption bands at $8.0\mu$ and $10.7\mu$ characteristic of the free acid group and the appearance of new infrared absorption bands at $5.45\mu$, $9.2\mu$ and $12.2\mu$. The resultant products appear homogenous, but have substantially modified properties in contrast with the reactant polymers. Compositions in which polyethylene is the major constituent, for example, resemble polyethylene in many respects but are infusible. Articles made therefrom can in fact withstand temperatures of 220° C. whereas the unmodified polymers flow at temperatures in the neighborhood of 100° C.

Accordingly, in the broadest description, this invention comprises the reaction product of an intimate blend of from 1 to 99 parts by weight of a copolymer of a lower aliphatic olefin, of which ethylene is preferred, with from 1 to 25 weight percent of an alpha-beta unsaturated acid, together with from 99 to 1 parts complementally of a melamine-formaldehyde resin.

The expression "copolymer" as employed herein is intended to embrace compositions made by the joint polymerization of an olefin and an unsaturated acid and also compositions in which an unsaturated acid is grafted to a preformed polyolefin, which products are known as graft copolymers. Acid copolymers may also be made by copolymerization (in the sense defined hereinabove) of an olefin with a compound such as an unsaturated ester which may then be hydrolyzed to a polymer containing acid groups.

Suitable olefins are ethylene, propylene, butene-1 and isobutene, of which ethylene is preferred.

The preferred acids are alpha-beta unsaturated carboxylic acids such as acrylic acid, methacrylic acid, ethacrylic acid, itaconic acid, citraconic acid, maleic acid, fumaric acid and the like, of which methacrylic acid is preferred.

Minor amounts of other copolymerizable compounds such as olefins having from 3 to 18 carbon atoms, vinyl and vinylidene halides (including fluoro compounds) styrene alpha methyl styrene, norbornene, vinyl acetate, methyl vinyl ether and the like, may also be incorporated in the copolymers.

Examples of acid-containing olefin copolymers which may be successfully reacted with melamine-formaldehyde resins are ethylene/acrylic acid copolymers, ethylene/methacrylic acid copolymers, ethylene/acrylic acid/methyl methacrylate copolymers, ethylene/methacrylic acid/ethyl acrylate copolymers, ethylene/methacrylic acid/vinyl acetate copolymers, ethylene/acrylic acid/vinyl alcohol copolymers, ethylene/styrene/acrylic acid copolymers, ethylene/methacrylic acid/acrylonitrile copolymers, ethylene/acrylic acid/vinyl methyl ether copolymers, ethylene/vinyl chloride/methacrylic acid copolymers, ethylene/vinylidene fluoride/acrylic acid copolymers, polyethylene/acrylic acid graft copolymers, polyethylene/methacrylic acid graft copolymers, polymerized ethylene-propylene/acrylic acid graft copolymers, polymerized ethylene-butene-1/methacrylic acid graft copolymer, polymerized ethylene-vinyl acetate/methacrylic acid graft copolymers, polypropylene/methacrylic acid graft copolymers, polybutene-1 acrylic acid graft copolymers, and polyethylene/acrylic acid ethyl acrylate graft copolymers.

The copolymer may also, after polymerization but prior to reaction with the melamine-formaldehyde resin, be further modified by various reactions such as crosslinking, chlorination, sulphochlorination or the like.

Methods of making acid-containing copolymers are well known in the art. In the case of polyolefins containing tertiary carbon atoms, it is preferred to polymerize the olefin using sterospecific catalysts to form substantially crystalline materials generally known as isotatic polymers. An example of such a catalyst is titanium trichloride in the violet modification admixed with an aluminum alkyl reducing agent such as aluminum triethyl or aluminum triisobutyl. The grafting may be accomplished by hydroperoxidation of a portion of the tertiary carbon atoms and thereafter decomposing the polymer hydroperoxide in the presence of the unsaturated acid by heating. Grafting may also be accomplished by the use of ionizing particulate or electromagnetic radiation such as alpha particles, beta rays, gamma rays and the like, or by organic compounds such as peroxides, hydroperoxides, peresters, azo compounds, or the like which decompose upon heating to yield organic free radicals. In this method the polymer is intimately mixed with the acidic olefin and thereafter with the free radical producing compound or it is exposed to radiation. In the case of polymers of the olefins containing 3 or more carbons the aforesaid processes tend to degrade the polymer and it is advantageous further to add a crosslinking agent such as divinylbenzene, diallyl furamate etc., in order to maintain the molecular weight.

Copolymers of ethylene and alpha-beta unsaturated acid may be made by the direct free radical copolymerization of ethylene and the desired acid at temperatures from about 150° C. to 250° C. and at pressures from about 10,000 p.s.i. to about 40,000 p.s.i.

The second polymeric component of the products of this invention are melamine-formaldehyde thermosetting resins which are well known in the art and available commercially.

The compositions of this invention, when fully reacted, are intractable materials and may be considered to be thermosetting resins. Accordingly, the polymeric components should be mixed at low temperature, in which case the mixture may be compression molded to form useful articles, the composition reacting further to form an infusible material during the molding process. The polymeric components may be blended in solution, generally in an aromatic organic solvent in which case gellation of the solution takes place in about 1 to 10 minutes depending on the selected polymeric reactants. Thereafter the gel may be precipitated by the addition of a non-solvent, preferably a lower aliphatic alcohol or ketone, dried, and formed into articles by compression molding.

The invention is further illustrated by the following examples which should not, however, be construed as fully delineating the scope of this discovery.

*Examples 1–3*

A solution of an ethylene-methacrylic acid copolymer containing 10% by weight of methacrylic acid and prepared by free radical polymerization was made by heating up 20 parts by weight of the copolymer with 80 parts of xylene at a temperature of about 130° C. A solution of "Uformite" MM–46, a commercial urea-formaldehyde polymer solution containing 60% solids, was added in the proportions shown herein below. After about 3 minutes, the solution gelled. Acetone was then added to precipitate the polymer, which was then filtered, washed with methanol, and dried. Similar mixtures were made with a second ethylene-methacrylic acid polymer containing 18% by weight methacrylic acid.

Tensile bars were compression molded from the various samples at 130° C. The composition of the various products together with their properties are shown in Table I.

TABLE I.—PROPERTIES OF ETHYLENE-METHACRYLIC ACID COPOLYMERS CROSSLINKED WITH MELAMINE-FORMALDEHYDE POLYMERS

| Ex. | Percent Acid in Copolymer | Percent "Uformite" MM–46 Added | Melt Index | Stiffness, p.s.i. | Ult. Tensile, p.s.i. | Ult. Elongation, Percent |
| --- | --- | --- | --- | --- | --- | --- |
| (Control) | 10 | | 5.8 | 10,000 | 3,414 | 500 |
| 1 | 10 | 16.7 | (1) | 10,220 | 3,170 | 270 |
| 2 | 10 | 23.4 | (1) | 10,450 | 2,760 | 310 |
| (Control) | 18 | | 6.3 | 16,400 | 5,010 | 500 |
| 3 | 18 | 30 | (1) | 9,470 | 3,360 | 270 |

[1] No flow.

The results indicate that surprisingly the crosslinking reaction did not result in embrittlement or substantial degradation of the physical properties. In particular the stiffness decreased rather than increased as would be expected.

The resistance to heat distortion was tested by hanging tensile bars in an air oven maintained at 220° C. The two control specimens obviously melted and flowed under their own weight. The crosslinked materials showed no tendency to elongate or drool.

*Examples 4–5*

A control sample of melamine-formaldehyde resin was prepared by evaporation of "Uformite" MM–46 in a vacuum oven and then heating at 100° C. for ½ hour.

The resin was clear and extremely brittle. A sheet was pressed at 150° C. then temperature was increased to 190° C. for 10 minutes.

50 grams of "Uformite" MM–46 was added to 50 ccs. of benzene, was mixed with a solution of 5 grams of a copolymer of ethylene, (55%) by weight vinyl acetate (35% by weight) and methacrylic acid (10% by weight) dissolved in 50 ccs. of benzene at a temperature of 70° C., with stirring. The benzene was evaporated and the dried composition was then processed into a sheet first at 150° C., then elevating the temperature of 190° C.

A similar composition was made using a free radical copolymer of ethylene and 20.8% by weight of methacrylic acid, melt index 12.6.

The physical properties of these compositions were measured and are shown in Table II.

TABLE II.—PROPERTIES OF MELAMINE-FORMALDEHYDE RESIN REACTED WITH 10% BY WEIGHT OF OLEFIN-ACID COPOLYMER

| Example | Composition of Olefin-Acid Copolymer | Stiffness, p.s.i. | Tensile Strength, p.s.i. | Elongation, Percent |
| --- | --- | --- | --- | --- |
| Control | | ~10⁶ | (1) | 0 |
| 4 | Ethylene 55%, vinyl acetate 35%, methacrylic acid 10% | 14,800 | 420 | 7 |
| 5 | Ethylene 79.2%, methacrylic acid 20.8% | 34,500 | 850 | 10 |

[1] Too brittle to measure.

*Example 6*

High molecular weight, commercially available polypropylene was reacted with molecular oxygen and a small amount of dicumyl peroxide in hot xylene solution to form a hydroperoxidized polypropylene. Acrylic acid was then added to the solution which was heated to decompose the hydroperoxide. The resultant graft copolymer was precipitated by cooling and adding n-butanol, the precipitate was filtered, washed with methanol, and dried. The melt flow of the polymer, measured at 190° C. under a pressure of 2160 grams in a melt flow instrument (ASTM–1238–57T) was 15. Infrared analysis showed that about 5% by weight of acrylic acid had been grafted to the polypropylene.

The acid copolymer was redissolved in xylene and a solution of "Uformite" MM–46 in an amount calculated to give 15 weight percent of the melamine-formaldehyde resin to the total polymeric solids was added. The solution rapidly gelled. Acetone was then added to precipitate the gel which was filtered, washed with methanol, and dried.

The product was a no-flow material which was heat stable at 220° C., but which could be compression molded. The tensile strength and stiffness of this product was only slightly less than the parent polypropylene.

*Example 7*

A copolymer of ethylene and fumaric acid having a melt index of 7.8 g./10 min. (ASTM–1238–57T) and containing 7 weight percent of fumaric acid was dissolved in xylene to give a solution having a concentration of 25 weight percent. To 250 ccs. of the copolymer solution 30 ccs. of "Uformite" MM–46 was added at a temperature of 150° C. The solution gelled in about 2 minutes, whereupon it was cooled to about 70° C. and 250 ccs. of acetone was added to complete the precipitation. The product was a no-flow polymer which could be compression molded to bars. Test bars suspended in an air oven at 220° C. showed no tendency to drool or elongate.

What is claimed is:

A composition of matter consisting essentially of the reaction product of 10 parts by weight of a copolymer of an aliphatic olefin having from 2 to 4 carbon atoms copolymerized with from 1 to 25 weight percent of an alpha-beta unsaturated carboxylic acid with 90 parts by weight of a melamine-formaldehyde resin.

References Cited by the Examiner

UNITED STATES PATENTS

| | | | |
|---|---|---|---|
| 3,201,374 | 8/1965 | Simms | 260—854 |
| 3,214,488 | 10/1965 | O'Donnell et al. | 260—854 |

MURRAY TILLMAN, *Primary Examiner.*

P. LIEBERMAN, *Assistant Examiner.*